Patented Nov. 9, 1937

2,098,276

UNITED STATES PATENT OFFICE 2,098,276

AZO DYES AND METHODS FOR THEIR PREPARATION

Samuel Coffey, Morvan Lapworth, and Wilfred Archibald Sexton, Blackley, Manchester, England, assignors to Imperial Chemical Industries Limited, a corporation of Great Britain No Drawing. Application May 11, 1935, Serial No. 20,982. In Great Britain November 30, 1932

12 Claims. (Cl. 260—91)

This application is a continuation-in-part of our co-pending application Serial No. 700,016, filed November 27, 1933, which matured into U. S. Patent No. 2,041,697, issued May 26, 1936.

In British Patent 377,739 and corresponding U. S. Patent No. 2,012,994 processes are described for producing new azo dyes by coupling diazotized or tetrazotized aromatic mono- or diamino compounds with an ortho-amino-aryl-thioglycollic acid.

We have now found that the improvements derivable from British Patent 377,739 (or U. S. Patent No. 2,012,994) are not limited to the employment of an ortho-amino-aryl-thioglycollic acid, that is, a compound of the general formula

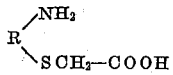

wherein R is an ortho-arylene radical of the benzene or the naphthalene series, but may be obtained by the use of other compounds which possess substituents adapted to form an azine ring by lactamization.

In particular we have found that instead of the thioglycollic acids, which form upon lactamization thiazine rings, one may use the corresponding ethers derived from glycollic acids, leading eventually to oxazine rings. Furthermore, the hydrogen in the $CH_2$ group may be replaced by methyl groups.

It is accordingly an object of our invention to provide a new series of dyestuffs which is adapted to produce fast colors upon textile fiber by dyeing the latter with a water-soluble form of the dyestuff, and then converting the dyestuff on the fiber into an insoluble lactam form.

Our novel series of dyestuffs is characterized by possessing in the coupling component a radical of the formula

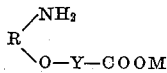

wherein R is a radical of the benzene series, Y stands for a radical of the series $CH_2$, $CH(alkyl)$ and $C(alkyl)_2$, while M stands for an alkali metal. When the dyestuff is in the transient form of free acid, M stands for hydrogen. After dyeing upon the fiber and lactamization by warming in dilute mineral acid, the above characteristic radical takes the form

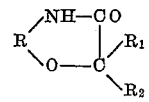

wherein $R_1$ and $R_2$ individually represent hydrogen or an alkyl group.

This invention may be more readily understood by a consideration of the following illustrative examples, in which the quantities are stated in parts by weight.

*Example 1.*—15.9 parts of 1,5-amino-naphthol were stirred with 500 parts of water. 36 parts of 36% hydrochloric acid were then added and the mixture cooled to 0°. A solution of sodium nitrite in 200 parts of water was added at 0–3° C.

The above diazo solution was added after half an hour to a solution of 18.9 parts of sodium-o-amino-phenoxy-acetate

40 parts of crystallized sodium acetate and 6 parts of acetic acid in 500 parts of water. The dark violet-brown dyestuff was filtered off and washed well with water. The product was preserved as a paste.

*Example 2.*—7.1 parts of 3-amino-4-methoxytoluene are dissolved in 60 parts of water and 11.5 parts of 36% hydrochloric acid. The solution is cooled to 0° C. and diazotized with 25 parts of 14% aqueous sodium nitrite. The diazo solution so obtained is added gradually to an ice-cold solution of 10.2 parts of sodium-2-amino-α-phenoxy-propionate

in 50 parts of water and 32 parts of 8% aqueous caustic soda. When coupling is complete the new dyestuff is isolated by the addition of common salt followed by filtration. The new dyestuff gives brownish solution in water and when dyed by the method described in Example 5 it colors wool in brown shades.

*Example 3.*—If the 7.1 parts of 3-amino-4-methoxytoluene of Example 2 are replaced by 7.9 parts of 4-chlor-2-anisidine a new dyestuff is obtained which gives brown shades on wool after lactamization by the method of Example 5.

*Example 4.*—A diazotized solution prepared in the usual way from 6.9 parts of 4-nitroaniline is added gradually to an ice-cold solution of 10.2 parts of sodium 2-amino-α-phenoxy-propionate in 50 parts of water and 32 parts of 8% aqueous caustic soda. When coupling is complete the new dyestuff is isolated by addition of common salt followed by filtration. The new dyestuff dyes wool in warm-brown shades in presence of ammonium acetate (method of Example 5), the shade remaining substantially unchanged by lactamization.

*Example 5.*—2 parts of a 45% paste of the dyestuff prepared according to Example 1 were dissolved in 400 parts of water containing 3 parts of 10% ammonia. 10 parts of wool were added, followed by 2 parts of 10% ammonium acetate solution. The whole was boiled for three-quarters of an hour when the wool dyed a light brown shade. The dyeing was rendered fast to washing by lactamization for half an hour at 80° C. in a bath containing 5% of hydrochloric acid.

It is, of course, to be understood that the examples given supra merely illustrate a few of the many compounds which come within the scope of the present invention. For instance, instead of 1-diazo-5-naphthol, one may select any other diazo component which is free of water-solubilizing groups, such as sulfonic and carboxylic acids. Diazo-azo or tetrazo compounds may likewise be selected, as discussed more fully in British Patent No. 377,739 (U. S. Patent No. 2,012,994) above referred to. In general, all the variations and details of procedure disclosed in said patent may be practiced with our invention, the novel feature being the replacement of the group S—CH₂—COOM by the group O—Y—COOM, wherein Y and M have the same significance as above. Of the common compounds included in this group may be mentioned o-amino-phenoxy-acetic acid, o-amino-α-phenoxy-propionic acid, and phenoxy-isobutyric acid.

This invention permits insoluble dyes to be produced in substance or on animal or vegetable fibers, the latter including derived fibers such as artificial silks from regenerated cellulose or from cellulose esters or ethers. The dyes referred to herein are rendered insoluble by the formation of a six membered lactam as above discussed.

Lactamization may be accomplished according to well known methods. The method which has been found exceptionally satisfactory herein is that wherein the dye is treated with a hot dilute mineral acid, hydrochloric and sulfuric acid being in general preferred.

The present invention permits the production of dyes having satisfactory fastness properties. These dyes may readily be rendered insoluble, and in all cases are understood to be capable of lactamization. This invention is of particular value in that it embraces and renders efficacious the selection of an exceedingly wide range of diazo bases and coupling components.

As many apparently widely different embodiments of this invention may be made without departing from the spirit and scope thereof, it is to be understood that the invention is not limited to the specific embodiments thereof except as defined in the appended claims.

In the claims below, the phrase "water-solubilizing group" should be understood as embracing the sulfonic acid and carboxylic acid groups, and their alkali-metal salts. These radicals are well known for their ability to impart water-solubility to aromatic compounds, and form a natural group, well recognized in the art. Also, in view of the capacity of our novel compounds of existing in three different forms, namely free acid form, salt form, and lactam form, and in view of the ready convertibility of these three forms into one another by simple treatment with acids or alkalis, respectively, it should be understood that the phrase "having in the form of its free acid the formula (so and so)" when referring to a compound or a dyestuff, is intended as a generic expression to cover all three forms.

We claim:

1. A process for the manufacture of new azo compounds which comprises coupling a compound including the radical of a diazotized aromatic amine, with a coupling component containing in its structure the radical

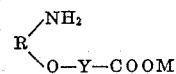

wherein R stands for an aryl radical of the benzene series, Y for a member selected from the group consisting of the radical CH₂, CH(alkyl) and C(alkyl)₂, and M for an alkali metal, the groups NH₂ and O—Y—COOM being located in ortho position to each other.

2. A process for the manufacture of azo dyes, which comprises coupling an aromatic diazo compound free from water-solubilizing groups with a compound of the general formula

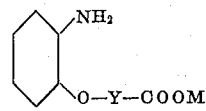

wherein Y stands for a member of the group consisting of CH₂, CH(alkyl) and C(alkyl)₂, and M stands for an alkali metal.

3. A process for the manufacture of an azo dye which comprises coupling an aryl-diazo compound which is free from water-solubilizing groups, to an alkali metal salt of ortho-amino-phenoxy-acetic acid.

4. A process for the manufacture of an azo dye which comprises coupling 1-diazo-5-naphthol to sodium-o-amino-phenoxy-acetate.

5. Organic compounds containing at least one azo group and having as an end component the alkali metal salt of an o-amino-α-phenoxy-alkyl-carboxylic acid in which the alkyl-carboxylic acid radical is a member of the group consisting of acetic, propionic and isobutyric acids.

6. Organic compounds containing at least one azo group and having as an end component the alkali metal salt of 1-amino-2-phenoxy-acetic acid.

7. Azo compounds adapted to be rendered insoluble by heating in dilute mineral acids, and having in the form of their hypothetical free acid the following general formula:

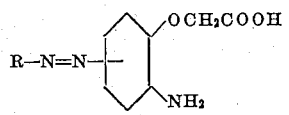

wherein R represents the residue of a diazotizable aromatic amine containing no water-solubilizing groups.

8. A dyestuff of the azo class adapted to dye animal and vegetable fiber, said dyestuff being water-soluble in substance but water-insoluble when dyed on the fiber, said dyestuff comprising in its structure a plurality of aryl nuclei joined together by at least one azo bridge and free from sulfo groups, said dyestuff being characterized by containing as end component an ortho-amino-α-phenoxy-alkyl-carboxylate radical of the group consisting of the corresponding acetate, α-propionate and isobutyrate radicals, when in substance, and by the presence of a lactam radical of the general formula

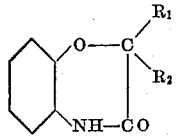

wherein $R_1$ and $R_2$ individually represent hydrogen or methyl, when on the fiber.

9. Textile material when dyed with the lactam form of a dyestuff as defined in claim 6.

10. The azo dyestuff obtainable by coupling diazotized 3-amino-4-methoxytoluene with an alkali-metal salt of 2-amino-α-phenoxy-propionic acid in alkaline medium, said compound corresponding to the formula

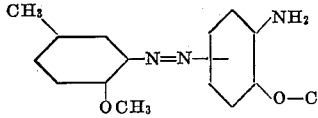

where M is an alkali-metal, and being adapted to be converted into a water-insoluble form by heating with dilute mineral acid.

11. The azo dyestuff obtainable by coupling diazotized 4-chlor-2-anisidine with an alkali-metal salt of 2-amino-α-phenoxy-propionic acid in alkaline medium, said compound corresponding to the formula

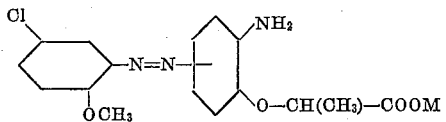

where M is an alkali-metal, and being adapted to be converted into a water-insoluble form by heating with dilute mineral acid.

12. The azo dyestuff obtainable by coupling diazotized 1:5-amino-naphthol with an alkali-metal salt of o-amino-phenoxy-acetate in alkaline medium, said compound corresponding to the formula

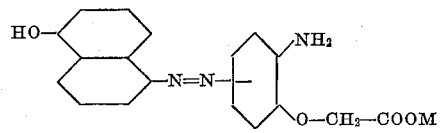

where M is an alkali metal, and being adapted to be converted into a water-insoluble form by heating with dilute mineral acid.

SAMUEL COFFEY.
MORVAN LAPWORTH.
WILFRED ARCHIBALD SEXTON.